US008794853B2

(12) United States Patent
Piccoli et al.

(10) Patent No.: US 8,794,853 B2
(45) Date of Patent: Aug. 5, 2014

(54) SUPPORT HEAD FOR AN OPTICAL OR VIDEO-PHOTOGRAPHIC APPARATUS

(75) Inventors: Igor Piccoli, Monticello Conte Otto (IT); Stelvio Zarpellon, Bassano del Grappa (IT); Enrico Cherubin, Cassola (IT)

(73) Assignee: Gitzo S.A., Rungis (FR)

( * ) Notice: Subject to any disclaimer, the term of this patent is extended or adjusted under 35 U.S.C. 154(b) by 0 days.

(21) Appl. No.: 13/582,476

(22) PCT Filed: Mar. 3, 2011

(86) PCT No.: PCT/EP2011/053220
§ 371 (c)(1),
(2), (4) Date: Nov. 13, 2012

(87) PCT Pub. No.: WO2011/107556
PCT Pub. Date: Sep. 9, 2011

(65) Prior Publication Data
US 2013/0051783 A1 Feb. 28, 2013

(30) Foreign Application Priority Data
Mar. 4, 2010 (IT) .............................. PD2010A0065

(51) Int. Cl.
| G03B 17/56 | (2006.01) |
| F16M 11/18 | (2006.01) |
| F16M 11/10 | (2006.01) |
| F16M 11/12 | (2006.01) |
| F16M 11/20 | (2006.01) |

(52) U.S. Cl.
CPC ......... *F16M 11/12* (2013.01); *F16M 2200/041* (2013.01); *G03B 17/56* (2013.01); *F16M 2200/044* (2013.01); *F16M 11/18* (2013.01); *F16M 11/10* (2013.01); *F16M 11/2014* (2013.01)

USPC .......................................................... 396/428

(58) Field of Classification Search
USPC .............................. 396/428; 248/183.1, 187.1
See application file for complete search history.

(56) References Cited

U.S. PATENT DOCUMENTS 2,551,971 A   5/1951  Sandager, Jr.
2,586,721 A * 2/1952  Rubin ......................... 248/183.1
(Continued)

FOREIGN PATENT DOCUMENTS

| DE | 1794420 U1 | 8/1959 |
| JP | 2000130686 A | 12/2000 |
| JP | 2008267518 A | 6/2008 |

OTHER PUBLICATIONS

ISR and Written Opinion mailed Jul. 7, 2011 in related PCT application PCT/EP2011/053220.

*Primary Examiner* — W B Perkey
(74) *Attorney, Agent, or Firm* — Kristina Castellano; Castellano PLLC

(57) ABSTRACT

A support head for an optical or video-photographic apparatus, having a first body traversed by a first axis of rotation with respect to a base of the head, a second body coupled in a rotary manner to the first body a third body traversed by a second axis of rotation and being coupled in a rotary manner to the second body. A user may lock by a single movement of a control member both the relative rotation of the first and second bodies about the first axis and the rotation of the second and third bodies about the second axis. The lock may be a tie-rod extended from the control member along the second axis and a slider connected to the tie-rod and interposed between the first body and the second body configured to lock the relative rotation of the second body with respect to the third body.

24 Claims, 3 Drawing Sheets

(56) References Cited

U.S. PATENT DOCUMENTS

| | | |
|---|---|---|
| 2,898,068 A | 8/1959 | Warren |
| 5,118,058 A | 6/1992 | Richter |
| 2004/0061035 A1* | 4/2004 | Nakatani .................... 248/278.1 |
| 2013/0051783 A1* | 2/2013 | Piccoli et al. ................. 396/428 |
| 2013/0058638 A1* | 3/2013 | Piccoli et al. ................. 396/428 |

* cited by examiner

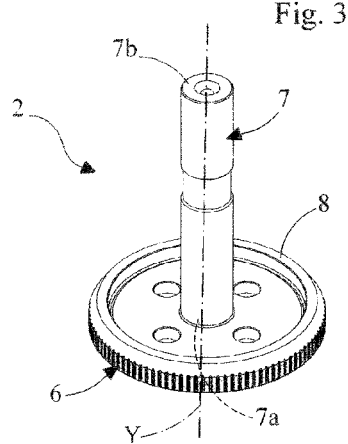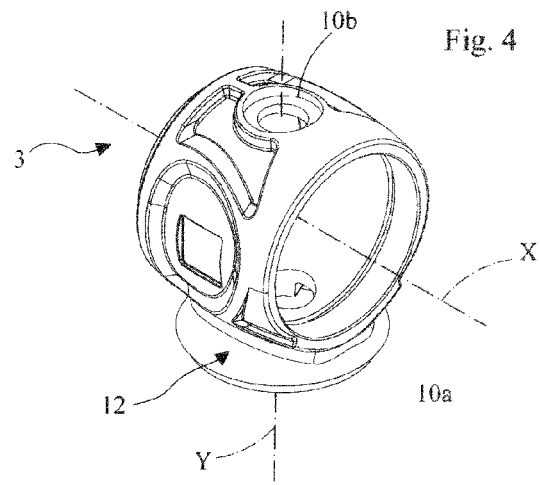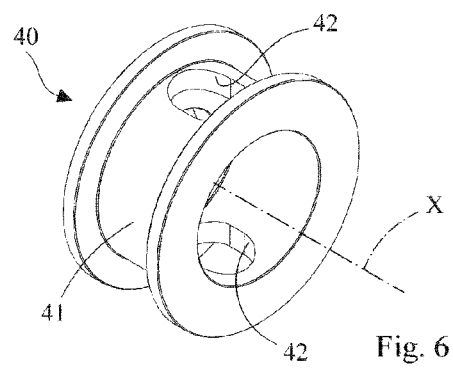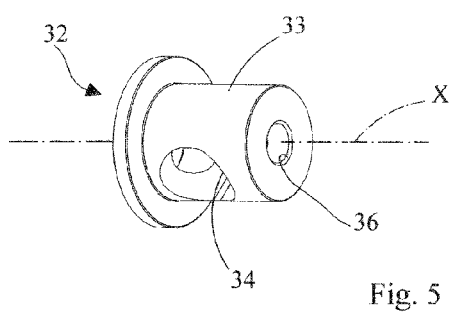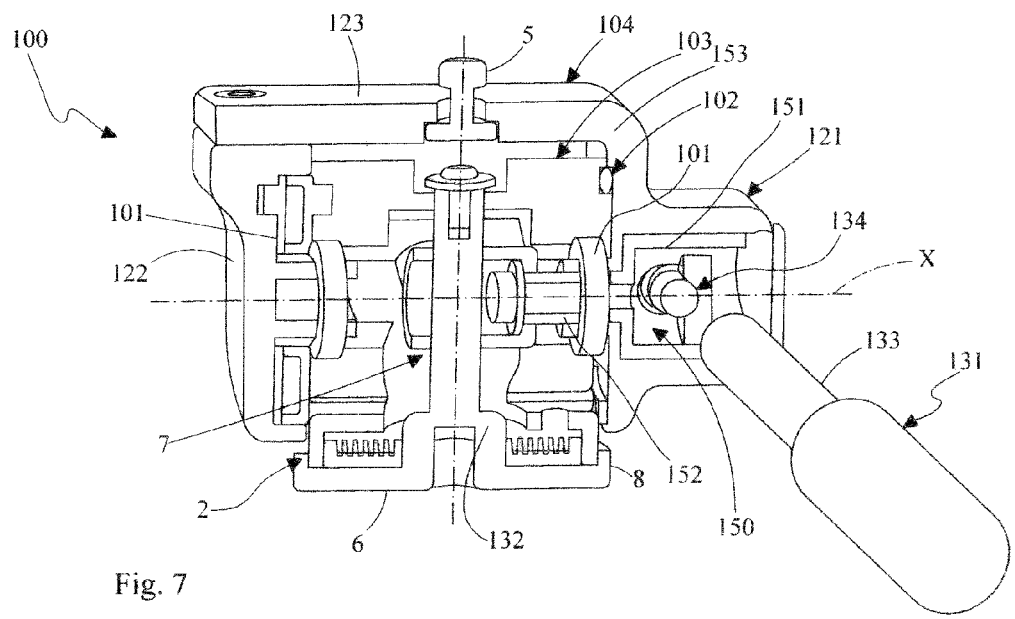

SUPPORT HEAD FOR AN OPTICAL OR VIDEO-PHOTOGRAPHIC APPARATUS

CLAIM FOR PRIORITY

This application is a U.S. National Stage Application of PCT/EP2011/053220 filed on Mar. 3, 2011, claiming priority to Italian patent application PD2010A000065 filed on Mar. 4, 2010, the contents of both of which are incorporated herein by reference.

TECHNICAL FIELD

The present invention relates to a support head for an optical or video-photographic apparatus having the technical features set out in the preamble of the main claim.

TECHNOLOGICAL BACKGROUND

The present invention is more particularly directed towards a support head which allows rotational movement of the optical or video-photographic apparatus about two mutually perpendicular axes.

In the technical field being referred to, there are known support heads which allow rotation of the optical or video-photographic apparatus about a so-called pan axis or a tilt axis or about a level axis.

In one standard configuration for mounting the video-photographic apparatus on the support head, the pan axis is a vertical axis and typically serves to rotate the apparatus by keeping it in the same horizontal plane (useful for horizontally adjusting a framing shot, for example, for panoramic shots), the tilt axis is a horizontal axis which serves to rotate the apparatus by keeping it in a vertical plane which extends through the optical axis of the apparatus (useful for vertically adjusting a framing shot) and the level axis is a horizontal axis which serves to rotate the apparatus by keeping it in a vertical plane which is perpendicular to the optical axis of the apparatus useful for moving from a horizontal position (landscape position) of the apparatus to a vertical position (portrait position).

There are particularly used support heads which are able to rotate at least about two of the three above-described axes.

Those support heads can be provided with locking mechanisms which are separate and independent for each axis of rotation or, conversely, can be provided with a mechanism which allows simultaneous locking/unlocking of the rotation about both axes with a single movement by the user.

An example of a mechanism of that second type which is widely used in the field is described, for example, in U.S. Pat. No. 6,739,559 and briefly comprises a first resiliently contractile collar which is connected to a pin which defines the pan axis, that first collar being open at two adjacent ends, from which there extend attachments which have a semi-cylindrical cross-section and which together define the tilt axis. Therefore, there is mounted, about the two semi-cylindrical attachments of the first collar, a second resiliently contractile collar which is open at the two ends thereof, from which there extend attachments which can be selectively moved together by actuating a clamping member, respectively. The second collar is further provided with attachment means for the video-photographic apparatus and the pin around which the first collar extends can be connected to (or is part of) a support structure, such as a tripod or the like.

With that device, the locking is brought about by acting on the single clamping member, for example, a threaded shaft, which moves together the attachments of the second contractile collar about the two semi-cylindrical attachments of the first collar, which in turn are moved together, clamping the first collar around the pin. In that manner, the second collar clamps around the attachments of the first collar, locking rotation about the tilt axis and the first collar becomes clamped around the pin, locking rotation about the pan axis.

However, the above-described known solution has some disadvantages, one of which is constituted by the non-simultaneous locking about the two axes. In reality, it is found that the locking of the two axes often occurs at quite distinct successive moments of time. It is considered that such a disadvantage is substantially attributable to the dimensional play and the different rigidities of the components of the device and that it could be limited by using specific materials and processing operations which are far more precise with low dimensional tolerances. However, that would involve an increase in costs which would act counter to the very aspect which constitutes the greatest advantage of this technical solution, that is to say, its cost-effectiveness.

Another disadvantage encountered in this type of locking mechanism is the "drift" effect which brings about a slight undesirable rotation of the first and/or second collar during the clamping movement thereof.

DISCLOSURE OF THE INVENTION

The problem addressed by the present invention is to realize a support head for optical or video-photographic apparatuses which is provided with a single control for locking rotation about two of the axes of rotation thereof and which is structurally and functionally configured to overcome the limitations set out above with reference to the cited prior art.

This problem is solved by the present invention by means of a support head realized in accordance with the appended claims.

BRIEF DESCRIPTION OF THE DRAWINGS

The features and advantages of the invention will be better appreciated from the detailed description of some preferred embodiments thereof which are illustrated by way of non-limiting example with reference to the appended drawings, in which:

FIG. 7 is a schematic longitudinal section of a second embodiment of a support head for an optical or video-photographic apparatus according to the present invention.

BEST MODES FOR CARRYING OUT THE INVENTION

Figure 1:
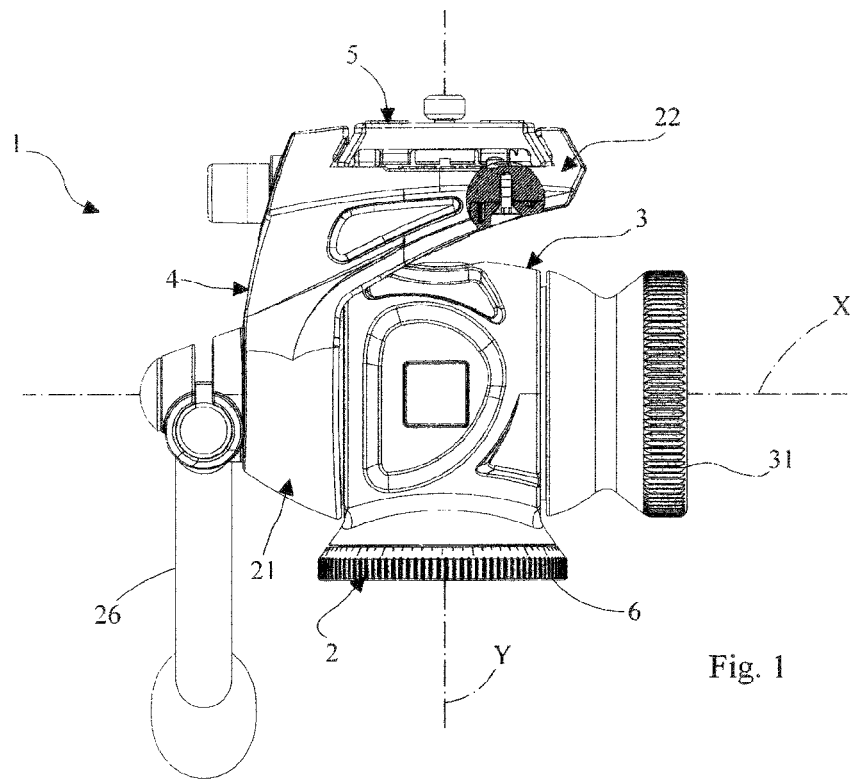
FIG. 1 is a side elevation of a first embodiment of a support head for an optical or video-photographic apparatus according to the present invention.
Figure 2:
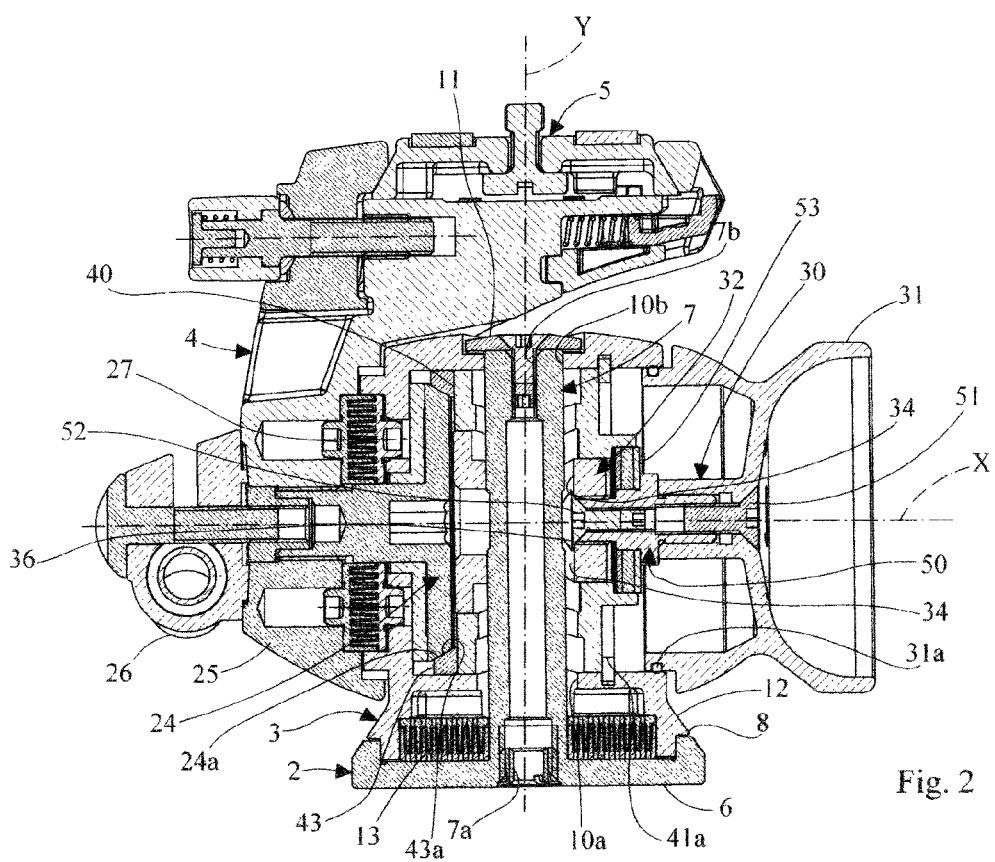
FIG. 2 is a longitudinal section of the support head of FIG. 1, FIGS. 3 to 6 are perspective views of components of the support head of FIG. 1, respectively.

With initial reference to FIGS. 1 to 6, a support head for an optical or video-photographic apparatus is generally designated 1 and represents a first embodiment of the present invention.

The head 1 comprises a first body 2 which forms a base of the head 1 and to which there is rotatably connected a second body 3, on which there is in turn mounted, with the capacity for rotation, a third body 4 which is provided with means 5 for attaching an optical or video-photographic apparatus which is not illustrated in the appended drawings.

In the remainder of the description of this first embodiment, the terms "first body" and "base" will be used in a generally interchangeable manner.

The base 2 illustrated in FIG. 3 comprises a support disk 6, from which there extends upwards a pin 7 which is coaxial with the support disk 6 and which defines a pan axis Y of the head 1.

The pan axis Y constitutes a first axis of rotation of the optical or video-photographic apparatus with respect to the base 2.

The pin 7 is engaged with an axial through-hole which is threaded at the opposite end 7a, 7b and the support disk 6 is surrounded by an externally graduated widened portion 8. The threaded end 7a of the pin 7 defined in the region of the support disk 6 constitutes a means for connecting the support head 1 to another support structure which is normally used in combination with a support head such as, for example, a tripod or a monopod.

The second body 3 illustrated in detail in FIG. 4 is of generally cylindrical form which is open at the two axially opposite ends, defining a tilt axis X which is substantially perpendicular to the axis of the pin 7.

The tilt axis X constitutes a second axis of rotation of the optical or video-photographic apparatus with respect to the base 2.

The second body 3 is further traversed by the pin 7 in the region of a pair of opposing through-holes 10a, 10b which are formed in the second body 3 so as to rotate about the pan axis Y.

A screw 11 which is screwed at the threaded end 7b keeps the base 2 connected to the second body 3, with the pin 7 circumferentially held by the second body 3 at the walls of the hole 10b.

The second body 3 further comprises a circular base 12 which is connected to the base 2 in the region of the support disk 6 and which abuts the widened portion 8 which externally surrounds it.

The diameter of the support disk 6, in the region of the surface of the widened portion 8 in abutment against the circular base 12, is substantially greater than the diameter of the pin 7 in the region of the hole 10b and constitutes a widened portion of the base 2, to which the second body 3 is connected.

Preferably, that diameter is greater than 30 mm and is between 40 and 80 mm.

In order to ensure adequate rotational movement between the base 2 and the second body 3, there is further provision for the interposition of a fluid type cartridge 13, which is known per se and commonly used in the art, between the support disk 6 and the circular base 12.

The third body 4 is rotatably connected to the second body 3 in the region of one of the open axial ends thereof so as to be able to rotate about the tilt axis X.

The third body 4 comprises a first portion 21 which is directly connected to the second body 3 and a second portion 22 which extends from the first portion 21 so as to project above the second body 3, and where the means 5 for attaching the optical or video-photographic apparatus are provided. The attachment means 5 are preferably of the quick-release type and will not be described in greater detail because they are conventional per se.

The first portion 21 of the third body 4 is anchored on the second body 3 by means of a screw type connection between a disk 24 which is received inside the second body 3 and an external plate 25.

A lever 26 for moving the head 1 is further advantageously mounted on the external plate 25 at the side opposite the second body 3.

A fluid type cartridge 27 is advantageously provided between the second body 3 and the external plate 25 in order to optimize the rotational movement of the third body 4 with respect to the second body 3 about the tilt axis X.

The support head 1 further comprises locking means 30 which are provided to lock or unlock, with a single movement by a user, both the rotation of the second body 3 with respect to the base 2 and the rotation of the third body 4 with respect to the second body 3.

The locking means 30 comprise a control member 31 of the type having a knob 31b, which is mounted on the second body 3 at the axial end opposite the third body 4 and can rotate about the tilt axis X with limited translation along said axis. An O-ring 31a is provided between the control member 31 and the internal wall of the second body 3.

A first restraining member 32 is connected to the control member 31 and is movable following actuation of the control member 31 along the tilt axis X with respect to the second body 3 in order to abut the pin 7 and to lock it against the second body 3.

The first restraining member 32 illustrated in FIG. 5 comprises a sleeve 33 which is cylindrical and coaxial with the tilt axis X, which is flanged at an axial end and which is received inside the second body 3 and able to move along the tilt axis X.

The sleeve 33 is further provided with opposing transverse openings 34, through which the pin 7 extends.

The locking means 30 further comprise a second restraining member 40 which is illustrated in FIG. 6 and which is received inside the second body 3 and can be moved with respect to the third body 4 along the tilt axis X in order to abut the third body 4 and lock it with respect to the second body 3. In that first embodiment of the invention, the second restraining member 40 comprises a sleeve 41 which is flanged at the opposite axial ends and which is provided coaxially with respect to the tilt axis X inside the second body 3. In particular, the sleeve 41 is arranged against the internal wall of the second body 3 and is able to slide along the tilt axis X towards and away from the third body 4. A resilient ring 41a is mounted on the second body 3 as a travel stop in order to prevent the unscrewing of the sleeve 41 from the second body 3 at the side of the control member 31.

Similarly to the sleeve 33, the sleeve 41 is also provided with two transverse through-holes 42, through which the pin 7 extends so that the sleeve 41 cannot rotate about the tilt axis X in relation to the second body 3. Preferably, in order to improve the compactness of the device, the sleeve 33 is received, with a capacity for relative sliding, substantially inside the second restraining member 40.

The second restraining member 40 further comprises a ring 43 which extends coaxially relative to the tilt axis X from an end flange of the sleeve 41 in the direction of the third body 4 and which is capable of abutment against the disk 24 of the third body 4.

Preferably, the ring 43 has a wedge-like tapered profile with an external edge thereof in abutment against the internal wall of the second body 3 and with an inclined internal edge 43a thereof directed towards the disk 24. Advantageously, the disk 24 also has a tapered cross-section, with an inclined external edge 24a facing the ring 43. In that manner, when the second restraining member 40 is moved towards the third body 4, the ring 43 becomes wedged between the disk 24 and the internal wall of the second body 3.

The locking means 30 further comprise an actuator member 50 which is interposed between the control member 31 and the first restraining member 32 which is fixedly joined by means of a screw 51 to the control member 31 and which extends along the tilt axis X in order to become engaged in a screwing manner with the sleeve 33 in the region of an axial opening 36 thereof opposite the flanged end. A screw 52 which is engaged at the axial end of the actuator member 50 opposite the control member 31 prevents the actuator member 50 from becoming unscrewed from the sleeve 33.

The actuator member 50 is rotatably supported by a bearing 53 which is mounted at an axial end of the sleeve 41 of the second restraining member 40 at the opposite side to the ring 43.

The locking of the rotation of an optical or video-photographic apparatus mounted on the head 1 about the pan axis and tilt axis is brought about by causing the knob 31b of the control member 31 to rotate, which brings about simultaneous rotation of the actuator member 50 about the tilt axis X. The rotation of the actuator member 50, owing to the threaded connection with the sleeve 33, causes the first restraining member 32 to move towards the control member 31 and therefore movement thereof along the tilt axis X, thereby urging the pin 7 against the second body 3. In particular, the base 2 is clamped between the first restraining member 32 and the second body 3 at one side in the region of the pin 7 and the hole 10b and, at the other side, in the region of the circular base 12 and the widened portion 8.

It will be appreciated that the locking action of the base 2 is particularly effective precisely in the region of contact between the circular base 12 and the widened portion 8 owing to the larger diameter of that widened portion with respect to the pin 7.

The action applied by the actuator member 50 during the movement of the sleeve 33 against the pin 7 is opposed, via the bearing 53, by the second restraining member 40 which is consequently urged to move against the third body 4, wedging the ring 43 against the disk 24.

In that manner, the force applied by the first restraining member 32 to the pin 7 is substantially counterbalanced by the force applied by the second restraining member 40 to the third body 4, obtaining effective simultaneity and uniformity of the two locking actions.

Owing to the absence of resilient deformations produced by the locking forces on the second and third body 3 and 4, angular movements during the locking action are further prevented, eliminating or at least substantially limiting the "drift effect".

Unlocking the rotations of the head 1 is simply brought about by rotating the knob 31b at the opposite side.

FIG. 7 illustrates a support head which is generally designated 100 and which constitutes a second embodiment of the present invention, wherein similar elements can be indicated with the same reference numerals as in the preceding embodiment.

In this embodiment, the first and the second axis of rotation are also formed by the pan axis Y and the tilt axis X, respectively, so that the first body of the head 100 is in alignment with the base 2.

However, the head 100 differs from the head 1 owing to the different configuration and functional inter-relationship between the second body 103, the third body 104 and the components of the locking means.

In particular, the third body 104 comprises two end portions 121 and 122 which are rotatably supported on the second body 103 at the axially opposite side by means of a pair of bearings 101 which are arranged coaxially with respect to the tilt axis X and which are joined together by a third portion 123 which projects above the second body 103 and on which there are provided the means 5 for attaching the optical or video-photographic apparatus.

A fluid type cartridge 27 is provided between the end portion 122 and the second body 103. There is further provided, between the second body 103 and the end portion 121 of the third body 104, at the side opposite the fluid type cartridge 27, a ring 102 which is preferably composed of material having a high friction coefficient and which is coaxial with the tilt axis X.

The actuator member 150 comprises a head portion 151, which is received inside the end portion 121 of the third body 104, and a rod 152 which extends from the head portion 151 so as to extend through the second body 103 and to be connected to the first restraining member 132.

The connection between the rod 152 and the first restraining member 132 is brought about by means of a screw 153 which is axially engaged directly with the rod 152 and whose head prevents the rod 152 from becoming unscrewed from the first restraining member 132.

The actuator member 150, at the side axially opposite the first restraining member 132, is connected to the control member 131 which comprises a lever 133 (illustrated in section in FIG. 7) which is secured to the end portion 121 of the third body 104 and which extends, with a capacity for free rotation about its longitudinal axis, in a substantially perpendicular manner relative to the tilt axis X.

In particular, the actuator member 150 is connected to the lever 133 by means of a cam 134 which is fixed to the lever 133 so that translation along the tilt axis X of the actuator member 150 corresponds to the lever 133 being rotated about its longitudinal axis.

The locking of the rotations of the head 100 about the axes X and Y is brought about by rotating the lever 133 about its longitudinal axis so as to move the actuator member 150 along the tilt axis X away from the pin 7. In that manner, the first restraining member 132 is moved against the pin 7 which in turn transmits the force to the second body 103 which is urged against the end portion 121 of the third body 104.

The action applied by the actuator member 150 to the first restraining member 132 is opposed by the lever 133 which, being secured to the end portion 122, in turn transmits that reaction to the third body 104 which is moved against the second body 103.

In that manner, the effect obtained is a clamping of the third body 104 against the second body 103 in the region of the ring 102, whose material having a high friction coefficient ensures effective locking of the mutual rotation between the two bodies.

It will be appreciated that, in this embodiment, the control member 131 acts as a second restraining member, thereby obtaining a substantial structural simplification of the support head according to the invention.

It will further be appreciated that, as in the preceding embodiment, the action of the first restraining member 132 against the pin 7 is completely opposed by the action of the third body 104 against the second body 103 because they act in the same direction so that the locking forces of the rotation actions about the pan axis Y and about the tilt axis X, respectively, are substantially balanced.

Figure 8:
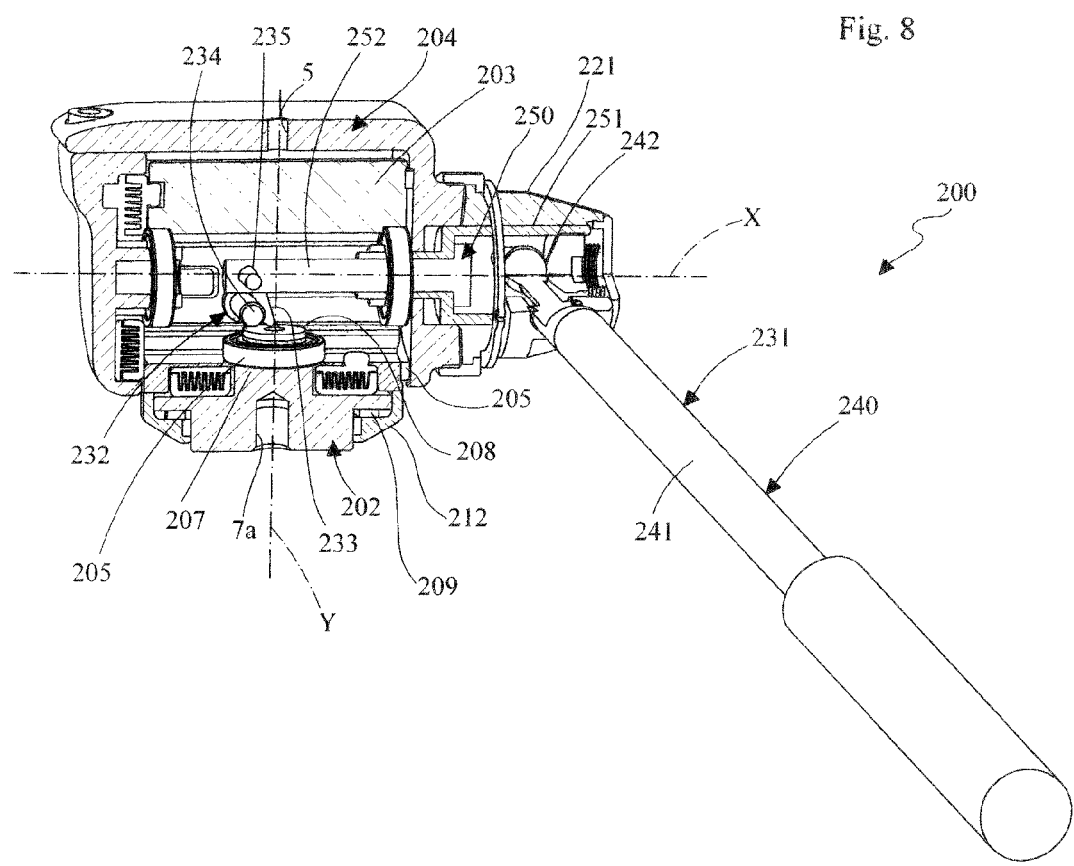
FIG. 8 is a schematic longitudinal section of a third embodiment of a support head for an optical or video-photographic apparatus which is not in accordance with the present invention.

FIG. 8 illustrates a support head which is generally designated 200 and which constitutes a third embodiment not in accordance with the present invention, in which similar elements can be indicated using the same reference numerals as in the preceding embodiments.

In that embodiment, the first and the second axes of rotation are also formed by the pan axis Y and the tilt axis X, respectively, so that the first body of the head 200 is formed by the base 202.

The head 200 has a configuration which is generally similar to the head 100, but differs substantially therefrom owing to a different configuration of the first restraining member 232 and the pin 207 of the base 202.

The pin 207 does not extend completely through the second body 203 but is instead introduced therein over a limited extent, projecting slightly from a bearing 205 which is provided on the second body 203 and by means of which the rotatable connection between the base 202 and the second body 203 is obtained.

The first restraining member 232 comprises a plate 233 which is pivotingly articulated to a pin 234 fixed to the second body 203 and which is connected to a first end of the rod 252 of the actuator member 250 by means of a plug 235 which is received in engagement in a hole formed in the rod 252.

The plate 233 is positioned in such a manner that, following pivoting about the pin 234, it is moved against a surface 208 of the pin 207, corresponding to the upper free end thereof, so as to apply to the pin 207 an action for moving the base 202 along the pan axis Y against the circular base 212 of the second body 203. A ring 209 having a high friction coefficient is advantageously interposed between the circular base 212 and the base 202 in order to improve the relative locking between those two components.

The head portion 251 of the actuator member 250 is connected, as in the case of the head 100, to the lever 240 of the control member 231 which is directly secured to the third body 204 and which extends therefrom in a substantially perpendicular manner relative to the tilt axis X.

The lever 240 is screwed to the end portion 221 of the third body 204. The rod 241 of the lever 240 has, in the region of the head portion 251, a portion 242 having a conical cross-section so that rotation of the lever about its axis brings about a movement of the portion having a conical cross-section along the axis of the lever which in turn brings about the translational movement of the actuator member 250 along the tilt axis X.

The lever 240 constitutes a construction variant of the lever 133 and the person skilled in the art will appreciate how the two variants can be used in a substantially interchangeable manner in the different embodiments described here.

The simultaneous locking of the rotation about the axes X and Y of the head 200 is brought about by rotating the lever 240 about its axis so that the portion 242 having a conical cross-section co-operates with the head portion 251 and moves the actuator member 250 along the tilt axis X.

That translation brings about pivoting of the plate 233 which moves against the pin 207, urging the whole base 202 against the second body 203 and bringing about relative locking thereof.

The action applied by the actuator member 250 to the first restraining member 232 is opposed, at least partially, by the control member 231 which, also acting in this case as a second restraining member, transmits the reaction to the third body 204 which is moved along the tilt axis X against the second body 203, bringing about locking of the relative rotation between the second body and third body about the tilt axis X, also owing to a ring 206 having a high friction coefficient being provided between the two bodies.

It will be appreciated that this configuration of the first restraining member allows an increase in the efficiency of the locking action between the base 202 and the second body 203 because the relative axial movement and tangential movement between the two components allows the use of a greater friction surface, substantially the entire surface of the ring 209.

The action applied by the actuator member 250 to the first restraining member is not, in this embodiment, opposed completely by the reaction developed by the second restraining member (the control member 231) but instead only the component parallel with the tilt axis X is opposed.

Therefore, the present invention solves the problem set out above with reference to the cited prior art, at the same time providing a number of other advantages, including the possibility of using "standard" dimensional tolerances (therefore, which are not excessively narrow and costly) for the components of the mechanism and obtaining a structure which is generally more rigid, determined by the geometry of the second and third body that is "closed" and not "open".

The invention claimed is:

1. A support head for an optical or video-photographic apparatus, comprising:
   a first body comprising a pin extending along a first axis (Y) of rotation of the apparatus with respect to a base of the head,
   a second body coupled in a rotary manner to said pin of the first body in order to rotate about this first axis,
   a third body traversed by a second axis (X) of rotation of the apparatus with respect to a base of the head, this second axis being substantially perpendicular to the first axis, and the third body being coupled in a rotary manner to the second body in order to rotate about this second axis, and
   locking means able to lock, by a single movement of a control member which may be carried out directly by a user, both the relative rotation of the first and second bodies about the first axis and the rotation of the second and third bodies about the second axis, these locking means comprising:
   i) a first restraining member associated with the first and second bodies and able to lock, following the movement of the control member, the relative rotation of the first body with respect to the second body,
   ii) a second restraining member associated with the second and third bodies and able to lock, following the movement of the control member, the relative rotation of the second body with respect to the third body, and
   iii) an actuator member interposed between the control member and the first restraining member and able to displace, following a movement of the control member, the first restraining member towards one of the first and second bodies in order to move these first and second bodies against one another and lock them, the actuator member also being connected to the second restraining member so as to displace the second restraining member towards one of the second or third bodies in order to move these second or third bodies against one another and lock them as a reaction to the displacement of the first restraining member,
   wherein the first body is coupled in a rotary manner with the second body at the location of the pin and at the location of a widened portion defined on the first body, the widened portion having a diameter greater than the pin so that, when the first body is displaced by the first restraining member against the second body, the first body is encountered by the second body at both the location of the pin and the widened portion; and wherein the first restraining member comprises a sleeve traversed by the pin at the location of opposing openings provided in the sleeve.

2. The support head according to claim 1, wherein the actuator member is connected to the second restraining member so that the displacement action to displace the first restraining member is opposed in full by the second restraining member so that the performance of the action on the first restraining member to command the locking of the first and second bodies causes an analogous reaction on the second restraining member to command the locking of the second and third bodies.

3. The support head according to claim 1, wherein the second restraining member is displaced towards the second or third body along the second axis of rotation (X).

4. The support head according to claim 1, wherein, following the displacement of the second restraining member, the second and third bodies are moved together along the second axis of rotation.

5. The support head according to claim 1, wherein the first restraining member is displaced towards the first or second body along the second axis of rotation.

6. The support head according to claim 5, wherein, following the displacement of the first restraining member, the first and second bodies are moved together along the second axis of rotation.

7. The support head according to claim 1, wherein the sleeve is housed in the second body and is able to move along the second axis of rotation.

8. The support head according to claim 1, wherein the diameter of the widened portion is greater than 30 mm.

9. The support head according to claim 1, wherein the widened portion is formed at the location of a support disk of the first body coaxial with the pin and coupled externally to the second body.

10. The support head according to claim 9, wherein the support disk is provided with means for coupling the head to an external support such as a tripod.

11. The support head according to claim 1, wherein the actuator member extends along the second axis of rotation in order to rotate about the latter, and is screw-coupled to the first restraining member in order to displace the first restraining member along the second axis of rotation (X) following the rotation of the actuator member.

12. The support head according to claim 1, wherein the second restraining member is housed in the second body and is able to move along the second axis of rotation towards and away from the third body.

13. The support head according to claim 12, wherein the second restraining member comprises a ring extending coaxially with the second axis of rotation towards the third body.

14. The support head according to claim 13, wherein the ring may abut against a disk of the third body housed in the second body.

15. The support head according to claim 14, wherein the ring and the disk both have a tapered cross-section with an inclined edge and abut against one another at the location of these respective edges.

16. The support head according to claim 12, wherein the first restraining member is housed, and is able to slide in relative terms along the second axis of rotation, within the second restraining member.

17. The support head according to claim 1, wherein the actuator member is supported in a rotary manner on the second restraining member.

18. The support head according to claim 1, wherein the control member is coupled rigidly with the actuator member and is mounted on the second body and able to rotate about the second axis of rotation.

19. The support head according to claim 1, wherein the second restraining member is formed by the control member which, when it opposes the action performed by the actuator member on the first restraining member, is displaced towards the second or third body.

20. The support head according to claim 19, wherein the control member is coupled to the third body so that, following the displacement of the control member, the second body is moved against the third body to lock its relative rotation about the second axis of rotation.

21. The support head according to claim 20, wherein the control member comprises a lever extending along a longitudinal axis substantially perpendicular to the second axis of rotation and coupled to the actuator member.

22. the support head according to claim 21, wherein the lever may rotate its longitudinal axis and is coupled to the actuator member at the location of a cam provided on this lever.

23. The support head according to claim 20, wherein the control member comprises a knob able to rotate about the second axis of rotation and screw-engaged with the actuator member so that a rotation of the knob causes the actuator member to move in translation along the second axis of rotation.

24. The support head according to claim 1, wherein the first body comprises a base of the head provided with means for coupling to an external support of the head and the third body is provided with means for attachment to the optical or videophotographic apparatus and wherein the first axis of rotation defines a panoramic axis of the head and the second axis of rotation defines a tilt axis of the head.

* * * * *